US010540506B2

(12) United States Patent
Hoppert

(10) Patent No.: US 10,540,506 B2
(45) Date of Patent: *Jan. 21, 2020

(54) FIELD-PROGRAMMABLE GATE ARRAY VIRTUALIZATION

(71) Applicant: Microsoft Technology Licensing, LLC, Redmond, WA (US)

(72) Inventor: Hadden Mark Hoppert, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 263 days.

This patent is subject to a terminal disclaimer.

(21) Appl. No.: 15/405,176

(22) Filed: Jan. 12, 2017

(65) Prior Publication Data

US 2018/0196951 A1  Jul. 12, 2018

(51) Int. Cl.
G06F 21/00 (2013.01)
G06F 21/60 (2013.01)
G06F 9/455 (2018.01)
G06F 15/78 (2006.01)

(52) U.S. Cl.
CPC ........ G06F 21/604 (2013.01); G06F 9/45558 (2013.01); G06F 15/7871 (2013.01); *G06F 2009/45587* (2013.01); *Y02D 10/12* (2018.01); *Y02D 10/13* (2018.01)

(58) Field of Classification Search
CPC .................................... G06F 21/604
USPC .......................................... 726/1
See application file for complete search history.

(56) References Cited

U.S. PATENT DOCUMENTS

| 7,150,011 B2 | 12/2006 | Ha et al. |
| 8,225,153 B2 | 7/2012 | Redondo et al. |
| 8,356,351 B2 | 1/2013 | Fu et al. |
| 8,406,682 B2 | 3/2013 | Elesseily et al. |

(Continued)

FOREIGN PATENT DOCUMENTS

| CN | 105335211 A | 2/2016 |
| KR | 20140119356 A | 10/2014 |

OTHER PUBLICATIONS

NPL—Hypervisor mechanism to Manage FPGA Reconfig—Xia @ Dec. 7, 2016.*

(Continued)

*Primary Examiner* — Longbit Chai

(57) ABSTRACT

Techniques for field-programmable gate array (FPGA) virtualization are described herein. In one or more implementations, an FPGA virtualization manager of a host device receives a request from a virtual machine for a device, such as for a compression engine. The FPGA virtualization manager identifies an FPGA program associated with the request and configured to program FPGAs of the host as the requested device. The FPGA virtualization manager also checks the FPGA program against security policies of the host to determine whether to allow the FPGA program to program the FPGAs. If the programming is allowed, the FPGA virtualization manager allocates at least a portion of the FPGAs to the requested device and loads the FPGA program to program the allocated portion of FPGAs. The FPGA virtualization manager generates a virtual device to furnish the functionality of the programmed device to the requesting virtual machine.

19 Claims, 7 Drawing Sheets

(56) References Cited

U.S. PATENT DOCUMENTS

| | | | |
|---|---|---|---|
| 8,635,675 | B2 | 1/2014 | Kruglick |
| 8,898,480 | B2 * | 11/2014 | LaMacchia ............. G06F 21/57 713/190 |
| 8,924,907 | B1 * | 12/2014 | Jahnke ................. G06F 17/504 716/116 |
| 9,286,444 | B2 | 3/2016 | Ogg et al. |
| 9,361,416 | B2 | 6/2016 | Fine et al. |
| 9,483,282 | B1 * | 11/2016 | Vandervennet ..... G06F 15/7871 |
| 2003/0061401 | A1 | 3/2003 | Luciani, Jr. |
| 2009/0300613 | A1 | 12/2009 | Doi |
| 2011/0041030 | A1 * | 2/2011 | Ko ...................... G06F 11/1016 714/752 |
| 2011/0106522 | A1 | 5/2011 | Chinya et al. |
| 2013/0346758 | A1 | 12/2013 | Lamacchia et al. |
| 2014/0215424 | A1 | 7/2014 | Fine et al. |
| 2016/0098505 | A1 | 4/2016 | Larzul |
| 2016/0210167 | A1 | 7/2016 | Bolic et al. |
| 2016/0239324 | A1 | 8/2016 | Tsirkin |
| 2018/0205553 | A1 | 7/2018 | Hoppert et al. |

OTHER PUBLICATIONS

Chen, et al., "Enabling FPGAs in the Cloud", In Journal of Conference on Computing Frontiers, May 20, 2014., 10 pages.

Wang, Wei, "Accessing an FPGA-based Hardware Accelerator in a Paravirtualized Environment", In Doctoral dissertation of University of Ottawa, 2013, 104 pages.

Byma, et al., "FPGAs in the Cloud: Booting Virtualized Hardware Accelerators with OpenStack", In Proceedings of IEEE 22nd Annual International Symposium on Field-Programmable Custom Computing Machines, May 11, 2014, pp. 109-116.

Byma, Stuart A., "Virtualizing FPGAs for Cloud Computing Applications", In Master Thesis of University of Toronto, 2014, 85 pages.

Koch, Dirk, "FPGA Virtualization for Enabling General Purpose Reconfigurable Computing", http://cc.doc.ic.ac.uk/fresh16/Dirk.pdf, Published on: Oct. 3, 2016, 26 pages.

Eguro, Ken, "Fpgas for Trusted Cloud Computing", In Proceedings of 22nd International Conference on Field Programmable Logic and Applications, Aug. 31, 2012, 8 pages.

"RC3E: Design and Test Automation in the Cloud", https://tu-dresden.de/ing/informatik/ti/vlsi/ressourcen/dateien/dateien_alt/rc3e/dateien/RC3E_DATE_16.pdf?lang=en, Retrieved on: Oct. 3, 2016, 1 pages.

"International Search Report & Written Opinion Issued in PCT Application No. PCT/US2017/068615", dated Mar. 26, 2018, 11 Pages.

Xia, et al., "Hypervisor Mechanisms to Manage FPGA Reconfigurable Accelerators", In International Conference on Field-Programmable Technology, Dec. 7, 2016, 9 Pages.

"Non Final Office Action Issued in U.S. Appl. No. 15/406,122", dated Jan. 3, 2019, 13 Pages.

Evtyushkin, et al., "Iso-X: A Flexible Architecture for Hardware-Managed Isolated Execution", In Proceedings of 47th Annual IEEE/ACM International Symposium on Microarchitecture, Dec. 13, 2014, 13 Pages.

Jain, et al., "SoK: Introspections on Trust and the Semantic Gap", In Proceedings of IEEE Symposium on Security and Privacy, May 18, 2014, 16 Pages.

"International Search Report and Written Opinion Issued in PCT Application No. PCT/US2017/068618", dated Mar. 8, 2018, 12 Pages.

Waller, et al., "Policy Based Management for Security in Cloud Computing", In FTRA International Conference on Secure and Trust Computing, Data Management, and Application, Jun. 28, 2011, 8 Pages.

* cited by examiner

FIELD-PROGRAMMABLE GATE ARRAY VIRTUALIZATION

BACKGROUND

In general, virtualization technologies have severed the one-to-one link between physical computing devices and operating systems by abstracting physical resources into virtualized resources. Virtualization allows multiple operating system instances or instances of an application to exist simultaneously on a same physical machine and in isolation from one another. Virtualization also enables multiple operating system instances to share a physical device's resources, such as to share storage devices, compression engines, networking devices, and so forth. These advances have led to the centralization of many computing resources, enabling various computing tasks to be performed "over the cloud."

By way of example, individuals associated with an enterprise may be given accounts that allow them to access an enterprise-configured desktop interface—the desktop interface may be configured to provide productivity tools selected by the enterprise, storage hosted by the enterprise, and so on. The desktop interface associated with a given individual may also be accessible via multiple different computing devices, e.g., a desktop device at work, a laptop device at home, a tablet device while traveling, and so forth. Though accessible from these multiple different computing devices, the functionality provided by the desktop interface may be furnished largely using the processing and storage resources of the enterprise's servers, rather than resources of the computing devices the individuals interact with directly. Moreover, virtualization techniques enable the processing and storage resources of these same servers to be leveraged further to provide personal desktop interfaces simultaneously to multiple individuals of the enterprise. Advances continue to be made in virtualization technologies, such as improving the speed with which computing tasks can be completed using virtual machines or reducing the cost of implementing systems by employing virtual machines. Nonetheless, some conventional techniques for implementing virtualization are expensive, vulnerable to security breaches, or tied to particular host-device hardware configurations. Consequently, virtualization may not be leveraged for many applications.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques for field-programmable gate array (FPGA) virtualization are described herein. In one or more implementations, an FPGA virtualization manager of a host device receives a request from a virtual machine for a device, such as to request use of a compression engine. A unique device identifier that corresponds to the requested device may be included with the request. The FPGA virtualization manager identifies an FPGA program that is associated with the unique identifier and is configured to program FPGAs of the host as the requested device. The FPGA virtualization manager also checks the FPGA program against security policies of the host to determine whether to allow the FPGA program to be loaded to program the host's FPGAs. Responsive to a determination that the FPGA program is allowed to be loaded, the FPGA virtualization manager allocates at least a portion of the FPGAs to the device and loads the FPGA program to program the allocated portion. The FPGA virtualization manager generates a virtual device to furnish the functionality of the programmed device to the requesting virtual machine.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
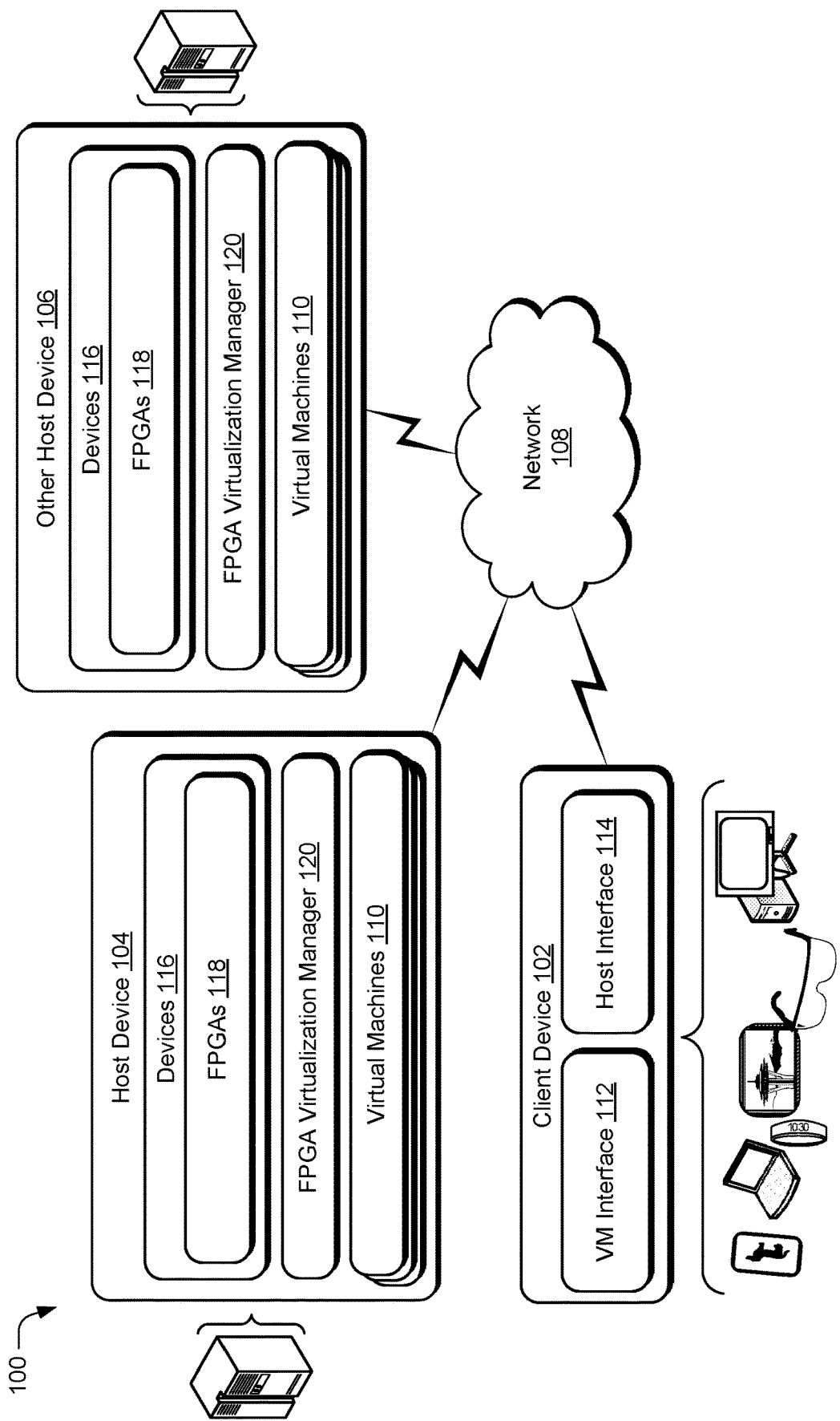
FIG. 1 is an illustration of an environment in an example implementation that is operable to employ techniques described herein.

Advances continue to be made in virtualization technologies, e.g., improving the speed with which computing tasks can be completed using virtual machines, reducing the cost of implementing systems by employing virtual machines, decoupling functionality from particular hardware configurations, and so forth. Nonetheless, some conventional techniques for implementing virtualization may be prohibitive to more widespread adoption. In general, virtualization can be implemented by host devices that furnish a host operating system. Under the host operating system, multiple guest operating systems can be instantiated. These guest operating systems may be referred to as "virtual machines," emulating computing devices and providing the functionality of physical computers.

In connection with providing such functionality, virtual machines typically leverage the physical devices of a respective host device. Host devices configured according to conventional techniques may include a variety of different physical devices to furnish virtual machines with a wide range of desired functionality. Examples of such physical devices include storage devices, compression engines, encryption engines, networking devices, and so on. However, conventional techniques may be limited to providing a functionality of the physical devices with which a corresponding host device is configured. For instance, a host device configured with a particular physical encryption engine may be limited to encoding data using only a protocol or protocols supported by that encryption engine. In other words, the host device may not be capable of encoding data using other protocols that are not supported by the particular physical encryption engine. In order to provide such functionality, another physical device may need to be added to the host. Configuring hosts with physical devices to support the endless combinations of functionality available may not be feasible, however.

Field-programmable gate array (FPGA) virtualization is described. In one or more implementations, a virtual machine requests from a host device functionality of a physical device. For instance, the virtual machine may request compression by a compression engine, encryption by an encryption engine, handling network traffic by a networking device, and so on. Not only may the virtual machine request the functionality of a physical device, but the virtual machine may also request the functionality provided by a particular physical device, such as a physical device developed by a particular developer, e.g., a BrandX compression engine for compressing data, a ServiceY video encoder for video encoding, and so forth. Broadly speaking, the request requests an FPGA virtualization manager to configure FPGAs of the host to provide the functionality of the specified device. By way of example, a request from a virtual machine for a compression engine requests that the FPGA virtualization manager configure the FPGAs as the compression engine.

The FPGA virtualization manager of the host can process the request initially to determine if the requested device is supported. This may involve determining whether the host includes or otherwise has access to a driver corresponding to the requested device. If the FPGA virtualization manager determines that the driver is available, the FPGA virtualization manager may also check the requested device against one or more security policies. The security policies may specify a list of particular devices that are safe and into which the FPGA virtualization manager is allowed to configure the FPGAs. The security policies may also specify a list of particular devices that are unsafe and into which the FPGA virtualization manager is prohibited from converting the FPGAs. For unlisted devices that are neither specifically allowed nor prohibited, the security policies may specify configuration criteria for the devices, such as in order to be allowed the device must reset if stalled, block out different registers, and so forth.

If the requested device is allowed by the security policies, the FPGA virtualization manager may allocate at least a portion of one or more FPGAs to the device, e.g., the portions to which the device is programmed. The FPGA virtualization manager may then load the corresponding driver, which programs the allocated portions of the FPGAs to provide the functionality of the requested device. For instance, a driver programs the allocated portions to provide the functionality of a requested compression engine.

The FPGA virtualization manager may then query the driver regarding how to expose a virtual device to the virtual machine. The virtual device may be configured to provide at least one of hardware access paths or software access paths to the programmed FPGA device so that the virtual machine can leverage the corresponding functionality. In general, the access paths provided via the virtual device emulate a fully functional physical device in the virtual machine even though the programmed FPGA device may or may not be a fully independent physical device in the host. In some scenarios, this may include emulation of a virtual peripheral component interconnect (PCI) device or a device specified on a simulated hardware bus. Further, the virtual device as specified by the driver can be flexible in its mappings to the hardware and software access paths, such that the virtual device may not directly correlate to the programmed FPGA device exposed on the host. Rather, the driver provides mappings for the FPGA virtualization manager to implement. By implementing partial virtual hardware devices, FPGA programs configured according to the described techniques may be smaller and more robust relative to conventional approaches. In other words, the techniques enable a portion of an FPGA to be virtualized to provide the functionality of a device—leaving other portions of the FPGA available for other uses. As a result, the described techniques can improve performance of operations performed by virtual machines, reduce power consumption, and enable resources of host devices (e.g., FPGAs) to be utilized at a higher density than conventional techniques.

Consider again the example in which the virtual machine requests functionality of a particular compression engine in accordance with one or more implementations. Once the allocated portions of the FPGAs are configured as the requested compression engine, the virtual machine may simply provide data for compression as input to the virtual device, which relays the data to the programmed FPGAs. The virtual machine may also obtain compressed data (compressed in the particular manner of the requested compression engine) output from the FPGAs and relayed via the virtual device.

In addition to the advantages mentioned above, host device configuration may be simplified by using the described techniques. Rather than configuring host devices with a variety of different physical devices to provide corresponding functionality, for instance, the described techniques allow host devices to be configured instead with FPGAs to provide the functionality of various different physical devices. By way of example, virtualizing FPGAs may enable a host device to provide the functionality of multiple different types of compression engines without actually being configured to include each of those different types of compression engines. This can result in a number of efficiencies for systems that employ FPGA virtualization, such as reducing costs because fewer pieces of hardware may be needed to support a same number of virtual machines, reducing equipment footprint, and so on.

In the following discussion, an example environment is first described that may employ the techniques described herein. Example procedures and implementation details are then described which may be performed in the example environment as well as other environments. Consequently, performance of the example procedures and details is not limited to the example environment and the example environment is not limited to performance of the example procedures and details.

Example Environment

FIG. 1 illustrates an operating environment in accordance with one or more embodiments, generally at 100. The environment 100 includes a client device 102 which can be embodied as any suitable device, such as a desktop, a smartphone, a tablet computer, a portable computer (e.g., a laptop), a desktop computer, a set-top box, a game console, or a wearable device. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers of a service provider utilized by a business to perform operations, provide a datacenter, and so on. Further examples of computing systems and devices suitable to implement techniques described herein are described below in relation to FIG. 7.

The environment 100 further includes host device 104 and other host device 106. The host device 104 and the other host device 106 may be implemented by one or more computing devices, such as one or more servers of a datacenter, and may also be representative of one or more entities. In accordance with one or more implementations, the host device 104 and the other host device 106 may represent functionality of a service provider to provide one or more services to the client device 102 over network 108. In general, service providers may make a variety of resources (e.g. content and services) available to clients of the network 108, which may include the hosts in some instances. Generally, resources made accessible by a service provider may include any suitable combination of services and/or content typically made available over a network by one or more providers. Some examples of services include, a virtual networking service (e.g., cloud computing), a streaming content service, a data storage service, a search service, an email service, an instant messaging service, an online productivity suite, and an authentication service to control access of clients to the resources. Content may include various combinations of text, multi-media streams, documents, application files, photos, audio/video files, animations, images, web pages, web applications, device applications, content for display by a browser or other client application, and the like.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The host device 104 and the other host device 106 are each illustrated as including virtual machines 110. The virtual machines 110 may be implemented as part of providing the above-mentioned services. Additionally, the virtual machines 110 may be implemented by virtual machine managers (not shown) of the host device 104 and the other host device 106. In general, a virtual machine manager may be capable of managing the creation (referred to herein as "instantiation"), operation, and termination of the virtual machines 110. In at least some implementations, the virtual machine managers are configured as instances of hypervisor that run on a respective host device. Further, the virtual machines 110 represent instances of virtual machines hosted by respective host devices.

To enable interactions between the client device 102 and the virtual machines 110, the client device 102 includes a virtual machine interface 112 (VM interface 112). According to various implementations, the VM interface 112 represents functionality to expose one or more of the virtual machines 110 to the client device 102. By way of example, the VM interface 112 generates a graphical user interface (GUI) via which a user may interact with one of the virtual machines 110, such as to provide input to the virtual machine and consume output from the virtual machine.

The client device 102 is also depicted having host interface 114, which represents functionality to enable the client device 102 to interface with the host device 104 and/or the other host device 106 outside of the virtual machines 110. For instance, the host interface 114 supports functionality to request that a virtual machine manager instantiate one of the virtual machines 110 for the client device 102. The host interface 114 may also provide other functionality to the client device 102, such as enabling the status of different virtual machines to be determined and/or manipulated. The host interface 114 may provide a virtual machine interface, for instance, that indicates a status of different virtual machines to which the client device 102 is permitted visibility.

At some level, the functionality and/or services provided to the client device 102 via the virtual machines 110 are provided, at least in part, using actual physical devices of the host device 104 and the other host device 106. Although devices 116 may include a variety of different physical devices to provide a range of functionality, the devices 116 also include field-programmable gate arrays 118 (FPGAs 118). In accordance with one or more implementations, the FPGAs 118 are programmable to provide the functionality of different physical devices, such as different compression engines, different encryption engines, and so forth. Additionally, a portion of an FPGA 118 may be programmable to provide the functionality of a particular physical device. In this way, a single FPGA 118 may be programmable to provide the functionality of multiple different physical devices simultaneously, e.g., both an encoding and compression engine, multiple different encryption engines, and so forth. Not only may a single FPGA 118 be programmable to provide the functionality of multiple different physical devices simultaneously, but multiple FPGAs 118 or portions of multiple FPGAs 118 may be programmed collectively with a program to provide some functionality, such as to enable deep learning for generating a neural network. The FPGAs 118 may be programmable to provide the functionality of a variety of different devices without departing from the spirit or scope of the techniques described herein. Some example such devices include encryption engines, networking devices, compression engines, graphics processing units (GPUs), data storage devices (such as hard drives), and so forth.

The host device 104 and the other host device 106 are also each illustrated with an FPGA virtualization manager 120. In accordance with the described techniques, the FPGA virtualization manager 120 virtualizes the FPGAs 118 to the virtual machines 110. To do so, the FPGA virtualization manager 120 is configured to receive requests from the virtual machines 110 to use a device of the host device 104 or the other host device 106. In one or more implementations, the FPGA virtualization manager 120 is part of the above-discussed virtual machine manager. In any case, the FPGA virtualization manager 120 also represents functionality to initiate programming of the FPGAs 118 to provide functionality of a variety of different requested devices. For instance, the FPGA virtualization manager 120 may initiate programming the FPGAs 118 (or a portion of the FPGAs 118) to provide functionality of a particular compression engine, then initiate reprogramming the FPGAs 118 (or the portion of the FPGAs) to provide functionality of a particular encryption engine.

In particular, the FPGA virtualization manager 120 may load device-specific drivers (not shown) to program the FPGAs 118 as specific devices. By way of example, there may be a driver for a Brand X compression engine that the FPGA virtualization manager 120 can load to program the FPGAs 118 as the Brand X compression engine. The programs of the device-specific drivers may be capable of configuring portions of the FPGAs 118 to provide this functionality, such as by configuring different portions as inputs, outputs, read-only registers, and so on. In one or more implementations, these programs may use a hardware description language (HDL) to configure the FPGAs 118.

Simply allowing any driver to configure the FPGAs 118 as any device can make the system (e.g., the host device 104, the other host device 106, the client device 102, and the components thereof) vulnerable to security breaches, both malicious and unintentional. Such security breaches may expose sensitive information (e.g., personally identifying information, confidential business information, financial information, and so forth) or create a conduit for accessing sensitive information. To prevent this, the FPGA virtualization manager 120 is further configured to implement security procedures in conjunction with allowing the FPGAs 118 to be programmed.

By way of example, the FPGA may check device-specific drivers against a security policy. The security policy may list device drivers that are allowed to program the FPGAs 118 and device drivers that are prohibited from programming the FPGAs 118, for example. In addition or alternately, a security policy may have criteria that a device driver's program must meet in order to be allowed to program the FPGAs 118. An example of such criteria may include that the device programmed into the FPGAs 118 automatically resets if stalled. Security policies may specify a variety of different criteria for programs that program the FPGAs 118 as devices without departing from the spirit or scope of the techniques described herein. Additionally, security policies may govern which device drivers and programs are allowed to program the FPGAs 118 in a variety of other ways that are different from specifying drivers that are allowed, drivers that are prohibited, and criteria the programs are to meet, in accordance with one or more implementations.

Assuming though that the FPGAs 118 are programmed as a requested device, the FPGA virtualization manager 120 may expose the FPGAs 118 as a virtual device to the virtual machines 110. Virtual devices enable the virtual machines 110 to access functionality of the devices programmed to the FPGAs 118. When the FPGAs 118 are programmed as a compression engine for instance, the virtual devices allow the virtual machines 110 to request data compression from the compression engine. To the virtual machines 110, the virtual devices emulate actual physical devices. Further, by programming a portion of a single FPGA 118 as a particular physical device and presenting just the programmed portion to an individual virtual machine as a full virtual device, the functionality of the FPGA can be shared among multiple virtual machines 110.

In accordance with one or more implementations, the host device 104 and/or the other host device 106 may be configured with a virtual peripheral component interconnect (PCI) infrastructure. In such scenarios, the FPGA virtualization manager 120 can use the virtual PCI infrastructure to expose the FPGAs 118 programmed as physical devices to the virtual machines 110. In so doing, the FPGA virtualization manager 120 may expose portions of the FPGAs 118 by presenting virtual devices in a way that mimics PCI Express (PCIe) devices.

Furthermore, the FPGA virtualization manager 120 is capable of virtualizing the FPGAs 118 and exposing the devices programmed thereto to virtual machines hosted by different host devices. By way of example, the host device 104's FPGA virtualization manager 120 may allow the virtual machines 110 of the other host device 106 to request functionality of a particular device, resulting in programming the FPGAs 118 of the host device 104. In a similar manner, the other host device 106's FPGA virtualization manager 120 may allow the virtual machines of the host device 104 to request functionality of a particular device, resulting in programming the FPGAs 118 of the other host device 106.

By accessing device functionality via virtual devices, the virtual machines 110 can leverage virtual devices provided using the FPGAs 118 of multiple host machines, including remote host machines. To this extent, the virtual machines 110 are not therefore tied to any specific physical device of a host. Since the virtual machines 110 are not tied to any specific physical device, the virtual machines 110 can migrate across different host devices. The virtual machines 110 may do so, for instance, based on the availability of the FPGAs 118 to provide device functionality.

Having described an example operating environment, consider now example details and techniques associated with one or more implementations.

Field-Programmable Gate Array Virtualization

To further illustrate, consider the discussion in this section of example scenarios, components, and procedures that may be utilized to virtualize field-programmable gate arrays (FPGAs). In general, functionality, features, and concepts described in relation to the examples above and below may be employed in the context of the example procedures described below. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Scenario

Figure 2:
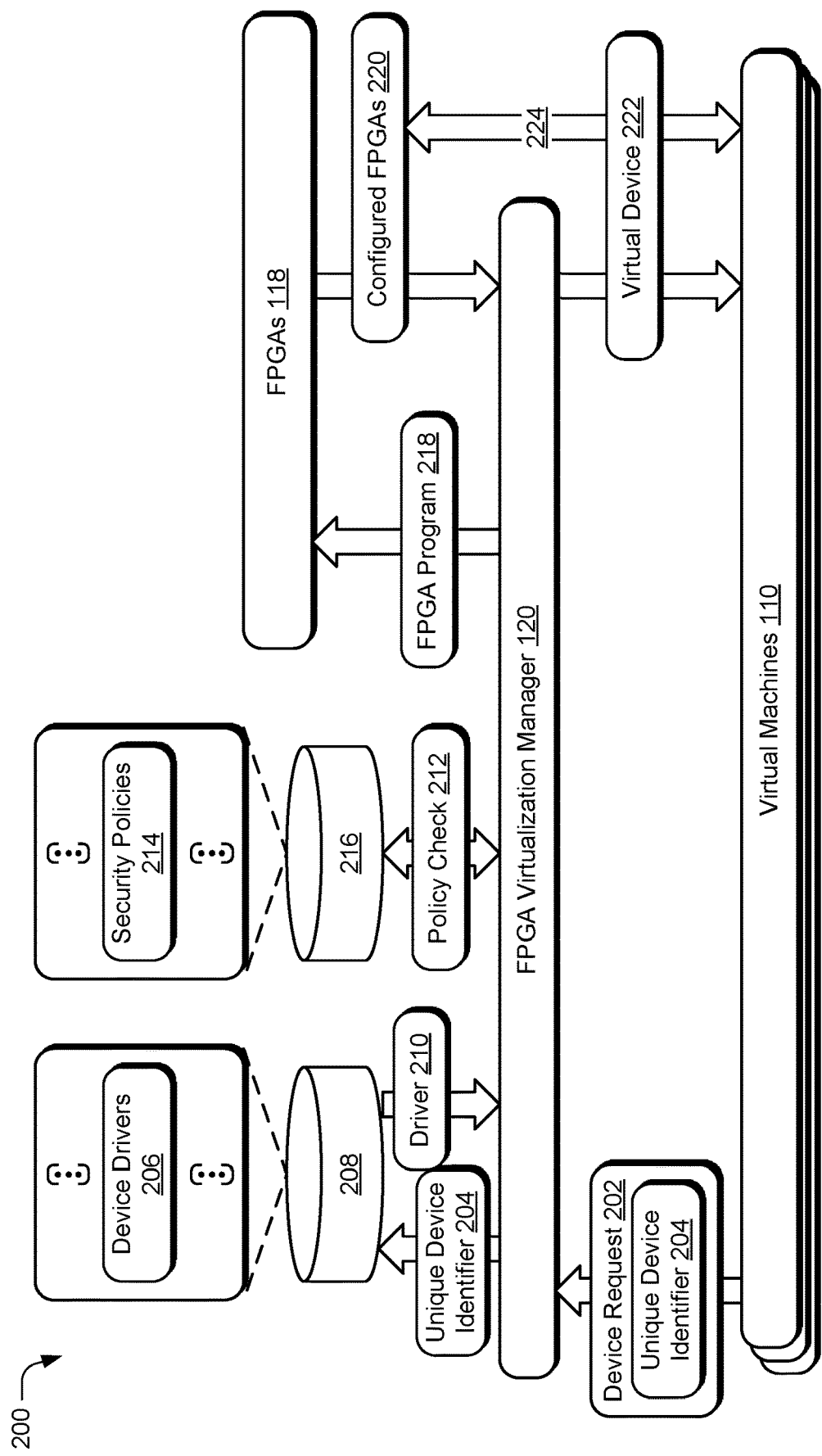
FIG. 2 is a diagram depicting an example scenario in which field-programmable gate arrays (FPGAs) of a host are configured to provide a virtual machine with functionality of a requested physical device in accordance with one or more implementations.

FIG. 2 depicts generally at 200 an example scenario in which FPGAs of a host device are configured to provide a virtual machine with functionality of a requested physical device in accordance with one or more implementations. The example scenario 200 includes, from FIG. 1, the virtual machines 110, the FPGAs 118, and the FPGA virtualization manager 120.

The example scenario 200 also includes device request 202 communicated from the virtual machines 110 to the FPGA virtualization manager 120. The device request 202 represents a request to leverage functionality of a requested device, e.g., by programming the FPGAs 118 to provide the functionality of the requested device. The device request 202 includes unique device identifier 204. The unique device identifier 204 is unique to and identifies a requested device. By way of example, a Brand X compression engine is associated with a unique device identifier that is different from other devices which can be programmed into the FPGAs 118. The unique device identifier 204 may be configured as a globally unique identifier (GUID), a universally unique identifier (UUID), or a string capable of uniquely identifying requested devices. The unique device identifier 204 may be configured in a variety of different formats to uniquely identify a device without departing from the spirit or scope of the techniques described herein.

The FPGA virtualization manager 120 represents functionality to use the unique device identifier 204 to determine whether device drivers 206 include a driver corresponding to the device request 202. The device drivers 206 are illustrated as being stored in storage 208, which may be included as part of the host device 104, the other host device 106, or a trusted remote driver storage service, for example. In other words, the FPGA virtualization manager 120 determines whether a driver corresponding to the unique device identifier 204 is available. If available, the FPGA virtualization manager 120 obtains the driver 210, such as from the storage 208. In general, the device drivers 206 represent functionality to program the FPGAs 118 as respective devices. The device drivers 206 may each include or otherwise have access to binary data corresponding to a program that is capable of programming the FPGAs 118 as a respective device. The device drivers 206 may also include configuration settings and other information that enables the FPGAs 118 to be configured as the respective devices and the functionality of those devices to be exposed for use by the virtual machines 110.

In the illustrated scenario 200, the driver 210 is determined to correspond to the device request 202, e.g., due to being associated with the unique device identifier 204. Once obtained, the FPGA virtualization manager 120 can carry out one or more security procedures relative to the driver 210. By way of example, the FPGA virtualization manager 120 can perform policy check 212 to determine whether the driver 210 complies with security policies 214. Broadly speaking, the security procedures (e.g., the policy check 212) are utilized to determine whether to allow the driver 210 to be loaded to program the FPGAs 118 or not. The security policies 214 are illustrated as being stored in storage 216, which may be included as part of the host device 104, the other host device 106, or a trusted remote security-policy storage service, for example.

As mentioned above, the security policies 214 may govern programming of the FPGAs 118 in a variety of different ways. For instance, the security policies 214 may include an allowed list and a prohibited list that identify (e.g., by unique device identifier), respectively, drivers that are allowed to be loaded to program the FPGAs 118 and drivers that are prohibited from being loaded to program the FPGAs 118. Alternately or additionally, the security policies 214 may specify criteria for the devices programmed to the FPGAs 118, such as that a device must reset if stalled or responsive to detecting a security breach, and so forth. Accordingly, the policy check 212 also represents functionality of the FPGA virtualization manager 120 to compare in-force security policies to various aspects of the device that corresponds to the driver 210.

Furthermore, the security policies 214 may be specified for different levels. The security policies 214 may include policies for a group level, a domain level, and an admin level, for instance. In some cases, the group level may allow different drivers to use their corresponding programs to program the FPGAs 118 than are allowed by the domain and/or the admin levels. It should be appreciated that there may be different levels of security policies 214 than those described. There may be just a single level, two levels, or four levels, for example. The security policies 214 may also be used to determine which device drivers are associated with programs that are allowed to program the FPGAs 118 or identify programs that are allowed to be used to program the FPGAs 118 in different ways than described herein without departing from the spirit or scope of the described techniques.

If the policy check 212 indicates that the driver 210 is not allowed load its corresponding program to program the FPGAs 118, then the FPGAs 118 are not programmed using the driver 210's program. In this case, the FPGA virtualization manager 120 may generate a notification indicating that the driver 210 is not secure based on a relevant security policy, and, accordingly, that the requested device cannot be programmed to the FPGAs 118. This notification can then be provided to the requesting virtual machine 110, which can trigger an error condition, cause the virtual machine to request a different device, and so forth.

If, however, the policy check 212 indicates that the driver 210's program is allowed to be loaded to program the FPGAs 118 as the requested device, the FPGA virtualization manager 120 allocates at least a portion of the FPGAs 118 to the device. The allocated portions of the FPGAs 118 correspond to those that are programmed to provide the functionality of the requested device. The allocated portion may correspond to less than entirety of a single FPGA 118 or may correspond to an entire FPGA 118. In some cases, the allocated portion may correspond to less than an entirety of multiple different FPGAs 118 (e.g., a quarter of first FPGA and a quarter of a second FPGA), to an entire FPGA and less than an entirety of at least one other FPGA, and so forth. In other words, the FPGA virtualization manager 120 allocates a quantity of programmable logic blocks of the FPGAs 118 to enable the requested device to be programmed thereto. The logic blocks can be programmed to have different hardware functions, such as to serve as input, output, storage, logic, and so forth.

Once a portion of the FPGAs 118 is allocated to the requested device, the FPGA virtualization manager 120 loads the FPGA program 218. The FPGA program 218 may correspond to a binary-data program that is capable of programming the FPGAs 118 as the requested device. This binary-data program is described above as being included as part of the driver 210. In such implementations, the FPGA virtualization manager 120 may simply load the driver 210, which can load the FPGA program 218 to program the FPGAs 118. In other implementations, however, the FPGA program 218 may be included with the device request 202, and simply taken from the device request 202 to program the FPGAs 118. In at least some of these implementations, the determination of an available driver based on the unique device identifier 204 may skipped. Implementations that skip the determination of an available driver are discussed in more detail in relation to FIGS. 3A and 3B. Regardless of whether the FPGA program 218 is included with the driver 210 or is taken directly from the device request 202, the FPGA program 218 is configured to program the allocated FPGAs 118 as the requested device.

The illustrated scenario 200 also depicts configured FPGAs 220. The configured FPGAs 220 represent that the FPGAs 118 have been configured as the requested device by the FPGA program 218. A signal may be provided to or obtained by the FPGA virtualization manager 120 that indicates the FPGAs 118 are configured as the requested device. Based on this, the FPGA virtualization manager 120 may query the driver 210 regarding how to expose virtual device 222 to the virtual machines 110—to provide the functionality of the configured FPGAs 220 (configured as the requested device) to the virtual machines 110. The virtual device 222 may be configured to provide at least one of hardware or software access paths to the configured FPGAs 220 so that the virtual machines 110 can leverage the corresponding functionality.

Once the virtual device 222 is provided, the virtual machines 110 may interact with the virtual device 222 to leverage the functionality of the device programmed to the FPGAs 118. To do so, a mapping of inputs of the virtual device 222 to inputs of the configured FPGAs 220 and outputs of the virtual device 222 to outputs of the configured FPGAs 220 may be used. Based on this mapping, the virtual device 222 can relay data between the virtual machines 110 and the configured FPGAs 220 to provide the functionality of the requested device to the virtual machines 110, e.g., compressed data if an encryption engine is requested, handling network traffic if a networking device is requested, and so forth. This relaying is represented by arrow 224.

Example Device Requests

Figure 3A:
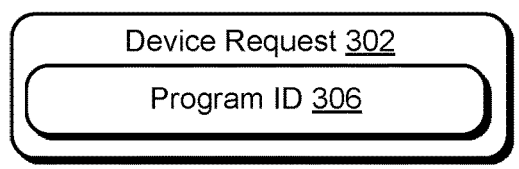
FIGS. 3A and 3B are diagrams depicting different example configurations of requests for FPGA virtualization in accordance with one or more implementations.
Figure 3B:
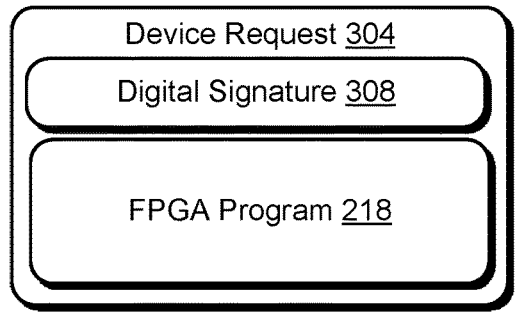

FIGS. 3A and 3B depict examples generally at 300 of requests for FPGA virtualization in accordance with one or more aspects. In particular, FIG. 3A depicts the device request 302 and FIG. 3B depicts the device request 304. Like the device request 202, the device requests 302, 304 correspond to requests from the virtual machines 110 to configure the FPGAs 118 as particular devices. The device requests 302, 304 are configured to include different information than the device request 202, and thus represent different scenarios.

The device request 302, for example, includes program identifier 306 (program ID 306). The program ID 306 represents information sufficient to identify an FPGA program that can be used to program the FPGAs 118. In scenarios where the device request 302 includes the program ID 306, the device drivers 206 may not be used. In the above-discussed scenario 200, the FPGA virtualization manager 120 checks functionality of the device drivers 206 against the security policies 214, such as to check whether the device corresponding to the driver 210 resets when the respective device stalls. In contrast, in scenarios where the device request 302 includes the program ID 306, the FPGA virtualization manager 120 may not check an identified FPGA program's functionality against the security policies 214. Instead, the program ID 306 may identify a provider of an FPGA program, and the FPGA virtualization manager 120 may check to see if the FPGA program provider is trusted according to the security policies 214. If the provider of the FPGA program is trusted, then the FPGA virtualization manager 120 may obtain the FPGA program, and use the obtained FPGA program to program the FPGAs 118 as the respective device.

The device request 304 represents a different scenario from the device request 302 and the device request 202. In the illustrated example, the device request 304 includes digital signature 308 and the FPGA program 218. FIG. 3B represents a scenario in which the digital signature 308 is checked to see if the request can be trusted. If the request is trusted, then the FPGA virtualization manager 120 may simply load the FPGA program 218 included with the device request 304 to program the FPGAs 118. The digital signature 308 may be capable of indicating whether the FPGA program 218 can be trusted, whether the virtual machine 110 making the request can be trusted, whether a provider of the FPGA program 218 can be trusted, whether there is an unbroken chain of trust (e.g., that the FPGA program 218 has not been exposed at some point in a manner that allows its security to be breached), and so forth. These and/or other security concerns may be checked using the digital signature 308. By ensuring that the FPGA programs come from trusted sources and remain unaltered, the digital signatures can prevent FPGA programs from breaching system security, both maliciously and unintentionally.

The approach represented by FIG. 3B may be more flexible, in terms of enabling the virtual machines 110 to leverage functionality of a wide variety of different physical devices, than the scenarios represented by the device requests 202, 302. Furthermore, device requests may be configured to include a variety of additional and/or different information without departing from the spirit or scope of the techniques described herein. Additional examples and details are discussed in relation to the following example security policy configuration.

Example Security Policy

Figure 4:
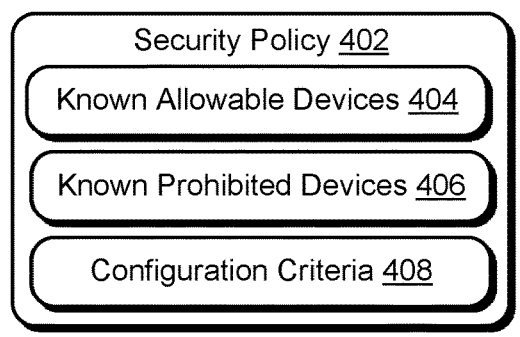
FIG. 4 is a diagram depicting an example configuration of a security policy that is usable to determine whether an FPGA program is allowed to be loaded to configure FPGAs of a host in accordance with one or more implementations.

FIG. 4 depicts an example generally at 400 of a security policy that is usable to determine whether an FPGA program is allowed to be loaded to configure FPGAs of a host in accordance with one or more implementations. In particular, FIG. 4 includes security policy 402, which may correspond to an example of the security policies 214. The security policy 402 is illustrated having known allowable devices 404, known prohibited devices 406, and configuration criteria 408. In accordance with the described techniques, the security policy 402 may be used to implement security, in relation to allowing the FPGAs 118 to be programmed, for at least one of multiple different levels, examples of which are described above.

The known allowable devices 404 may represent a list of devices that are allowed to be programmed to the FPGAs 118. The known allowable devices 404 may be associated with unique device identifiers, enabling the FPGA virtualization manager 120 to compare a unique device identifier of an obtained driver against the list. If an associated identifier is found on the known allowable devices 404 list, the FPGA virtualization manager 120 may allow the obtained driver to initiate programming of the FPGAs 118.

In contrast, the known prohibited devices 406 represents a list of devices that are not allowed to be programmed to the FPGAs 118. Like the known allowable devices 404, the known prohibited devices 406 also may be associated with unique device identifiers. This enables the FPGA virtualization manager 120 to compare a unique device identifier of an obtained driver against the known prohibited devices 406. If an associated identifier is found on the known prohibited devices 406 list, the FPGA virtualization manager 120 prohibits the obtained driver from initiating programming of the FPGAs 118.

The configuration criteria 408 may be used for drivers that are not listed on either the known allowable devices 404 or known prohibited devices 406 list. Rather than specifying simply whether a driver's program is allowed to be loaded or not, the configuration criteria 408 may specify criteria that a device programmed to the FPGAs 118 must meet in order to be allowed. The FPGA virtualization manager 120 represents functionality to determine whether a driver meets the configuration criteria 408. According to the determination, the FPGA virtualization manager 120 may allow a driver to initiate programming of the FPGAs 118 or prohibit the driver from programming the FPGAs 118.

Although illustrated with the known allowable devices 404, the known prohibited devices 406, and the configuration criteria 408, the security policy 402 may be configured with different information to implement security without departing from the spirit or scope of the techniques described herein. Additional examples and details are discussed in relation to the following example procedures.

Example Procedures

Figure 5:
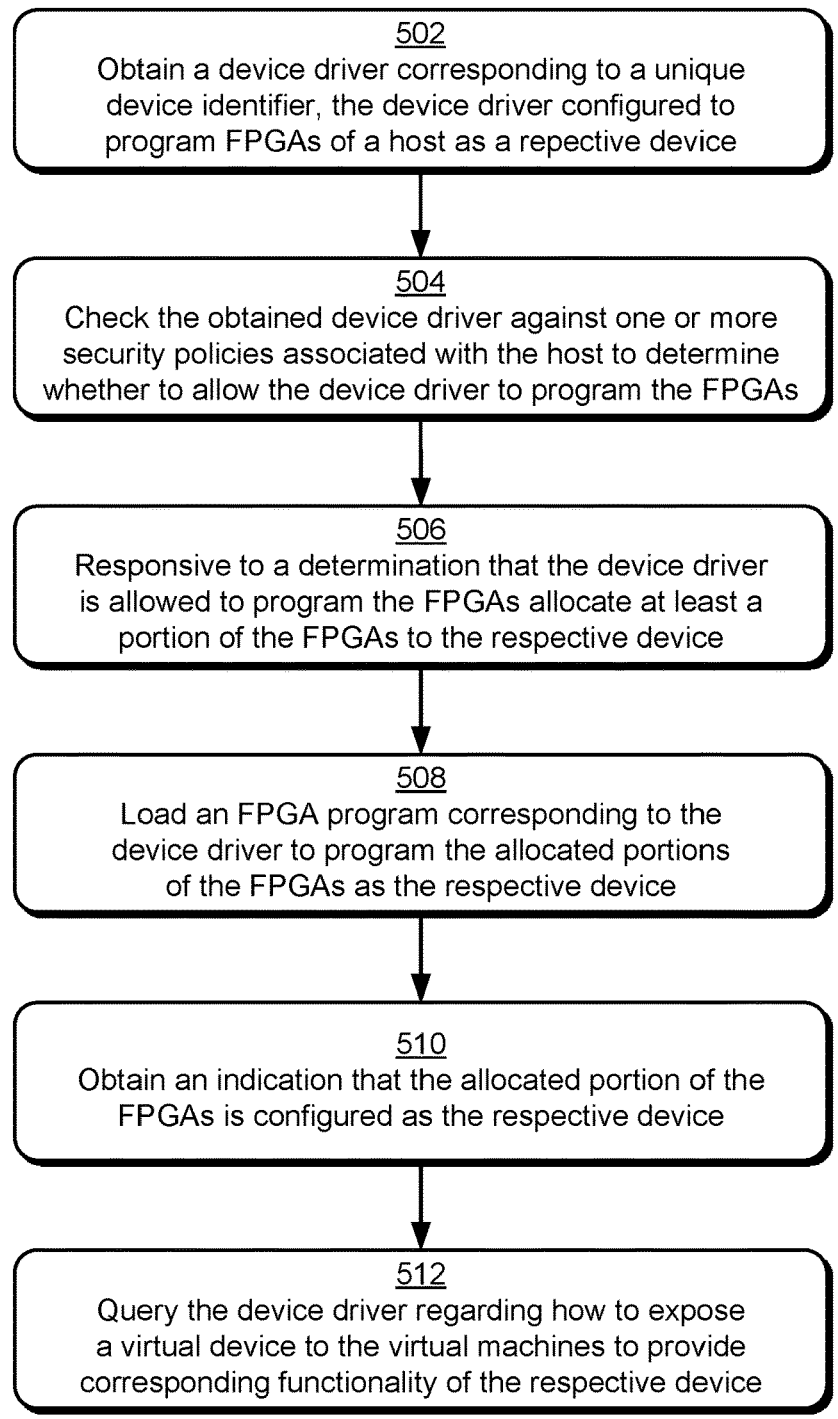
FIG. 5 is a flow diagram depicting an example procedure to configure FPGAs of a host as a requested physical device in accordance with one or more implementations.
Figure 6:
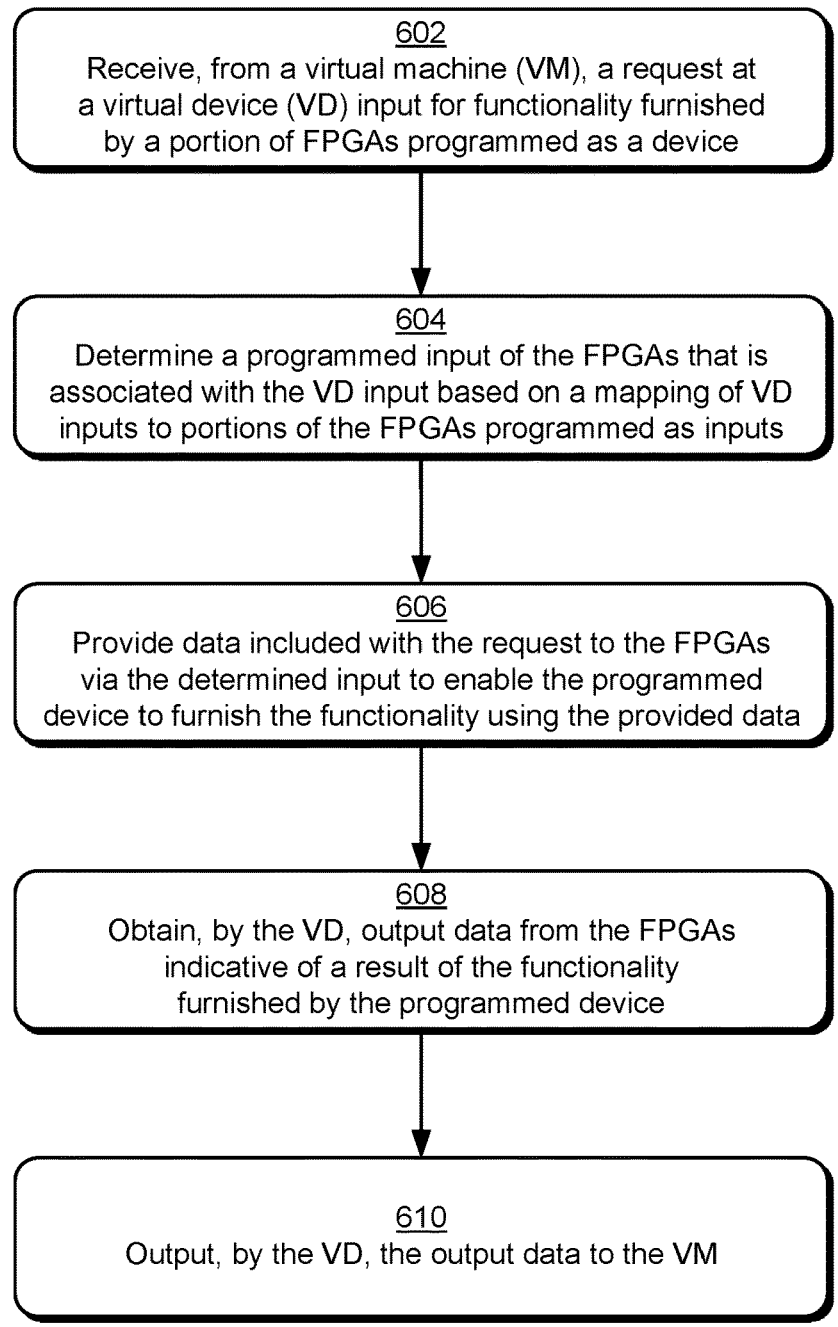
FIG. 6 is a flow diagram depicting an example procedure to leverage FPGA virtualization to furnish functionality of a physical device in accordance with one or more implementations.

Further aspects of field-programmable gate array (FPGA) virtualization are discussed in relation to example procedures of FIGS. 5 and 6. The procedures are represented as sets of blocks that specify operations performed by one or more devices and are not necessarily limited to the orders shown for performing the operations by the respective blocks. Aspects of the procedures may be implemented in hardware, firmware, or software, or a combination thereof. Some aspects of the procedures may be implemented via one or more host devices, such as via a host device 104 and/or other host device 106 that maintain and provide access to an FPGA virtualization manager 120 or otherwise. Aspects of the procedures may also be performed by a suitably configured device, such as the example client device 102 of FIG. 1 that includes or makes use of a VIVI interface 112 and host interface 114.

FIG. 5 depicts an example procedure 500 for configuring FPGAs of a host as a requested physical device in accordance with one or more implementations.

At 502, a device driver is obtained that corresponds to a unique device identifier. In accordance with the principles discussed herein, the device driver is configured to load a program to program FPGAs of a host device as a respective device. By way of example, the driver 210 corresponds to the unique device identifier 204 and the FPGA virtualization manager 120 obtains the driver 210 from the device drivers 206, e.g. from the storage 208 of the host device 104 or the other host device 106. The driver 210 includes the FPGA program 218, which is configured to program the FPGAs 118 of the host device 104 or the other host device 106 as a respective device, such as a networking device, a compression engine, an encryption engine, a data storage device (such as a hard drive), and so forth.

At 504, the obtained device driver is checked against one or more security policies associated with the host. In accordance with the principles described herein the obtained device driver is checked to determine whether to allow the program of the device driver to be loaded to program the FPGAs. By way of example, the FPGA virtualization manager 120 checks the driver 210 against the security policies 214. In particular, the FPGA virtualization manager 120 performs the policy check 212 to determine whether the driver 210 is allowed to program the FPGAs 118 as the respective device. Responsive to a determination that the security policies 214 prohibit the driver 210 from programming the FPGAs 118, the method stops, and the FPGA virtualization manager 120 does not allow the driver 210 to program the FPGAs 118.

Responsive to a determination that the program associated with the device driver is allowed to program the FPGAs, however, at 506, at least a portion of the FPGAs is allocated to the respective device. By way of example, the FPGA virtualization manager 120 determines at 504 that the driver 210 is allowed to load the FPGA program 218 to program the FPGAs 118 as the respective device. Responsive to this determination, the FPGA virtualization manager 120 allocates a portion of the FPGAs 118. The allocation corresponds to the portion of the FPGAs 118 that the FPGA program 218 will program as the respective device. In other words, the allocated portion of the FPGAs 118 is reserved for programming as the respective device.

At 508, an FPGA program corresponding to the obtained device driver is loaded to program the allocated portions of the FPGAs as the respective device. By way of example, the FPGA virtualization manager 120 loads the FPGA program 218 to program the portion of the FPGAs 118 allocated at 506 as the respective device. In so doing, the FPGA program 218 configures the allocated portions of the FPGAs 118, e.g., as input, output, storage, logic, and so forth. In one or more implementations, the FPGA program 218 specifies the particular configuration of the allocated portion of the FPGAs 118 using a hardware description language (HDL).

At 510, an indication is obtained that indicates the allocated portion of the FPGAs is configured as the respective device. By way of example, the FPGA virtualization manager 120 obtains an indication of the configured FPGAs 220. This represents that the FPGAs 118 have been programmed as the respective device. Further, the configured FPGAs 220 correspond to the respective device, which can be leveraged by the virtual machines 110. In some implementations, the configured FPGAs 220 correspond to a portion of a single FPGA programmed as the respective device or hardware implementation of a program, e.g., a machine learning algorithm.

At 512, the device driver is queried regarding how to expose a virtual device to the virtual machines to provide corresponding functionality of the respective device. By way of example, the FPGA virtualization manager 120 queries the driver 210 regarding how to expose the virtual device 222 to the virtual machines 110. The virtual device 222 provides hardware and/or software access paths to the configured FPGAs 220 so that the virtual machines 110 can leverage the corresponding functionality. In general, the virtual device 222 enables the virtual machines to leverage the functionality of the configured FPGAs 220—the functionality of the device programmed into the FPGAs 118.

FIG. 6 depicts an example procedure 600 in which FPGA virtualization is leveraged to furnish functionality of a requested physical device to a virtual machine in accordance with one or more implementations.

At 602, a request is received at a virtual-device input from a virtual machine. In accordance with the principles discussed herein, the request requests functionality furnished by a portion of FPGAs programmed as a device. By way of example, a request is received at an input of the virtual device 222 from one of the virtual machines 110. The received request requests functionality that is furnished by the configured FPGAs 220.

At 604, a programmed input of the FPGAs that is associated with the virtual-device input is determined. In accordance with the principles discussed herein, the programmed input of the FPGAs is determined based on a mapping of virtual-device input and output to respective programmed input and output of the FPGAs. By way of example, the FPGA virtualization manager 120 determines a programmed input of the configured FPGAs 220 that is associated with the input of the virtual device 222. The FPGA virtualization manager 120 makes this determination by referencing a mapping of inputs and outputs of the virtual device 222 to portions of the configured FPGAs 220 that are programmed to serve as inputs and outputs.

At 606, data included with the request is provided to the FPGAs via the determined input. In accordance with the principles discussed herein, this enables the device programmed into the FPGAs to furnish its functionality using the provided data. By way of example, data corresponding to the request received at 602 is provided to the input of the configured FPGAs 220 determined at 604.

At 608, output data is obtained by the virtual device from the FPGAs. In accordance with the principles discussed herein, the output data is indicative of a result of the functionality furnished by the device programmed to the FPGAs. By way of example, the virtual device 222 obtains data from the configured FPGAs 220. Further, the obtained data is indicative of a result of the functionality furnished by the device programmed into the configured FPGAs 220. When the device corresponds to a compression engine, for example, the output data may correspond to a compressed file format. At 610, the output data is output from the virtual device to the virtual machine. By way of example, the output data obtained at 608 is output by the virtual device 222 to one of the virtual machines 110.

Having described example procedures and details in accordance with one or more implementations, consider now a discussion of example systems and devices that can be utilized to implement the various techniques described herein.

Example System and Device

Figure 7:
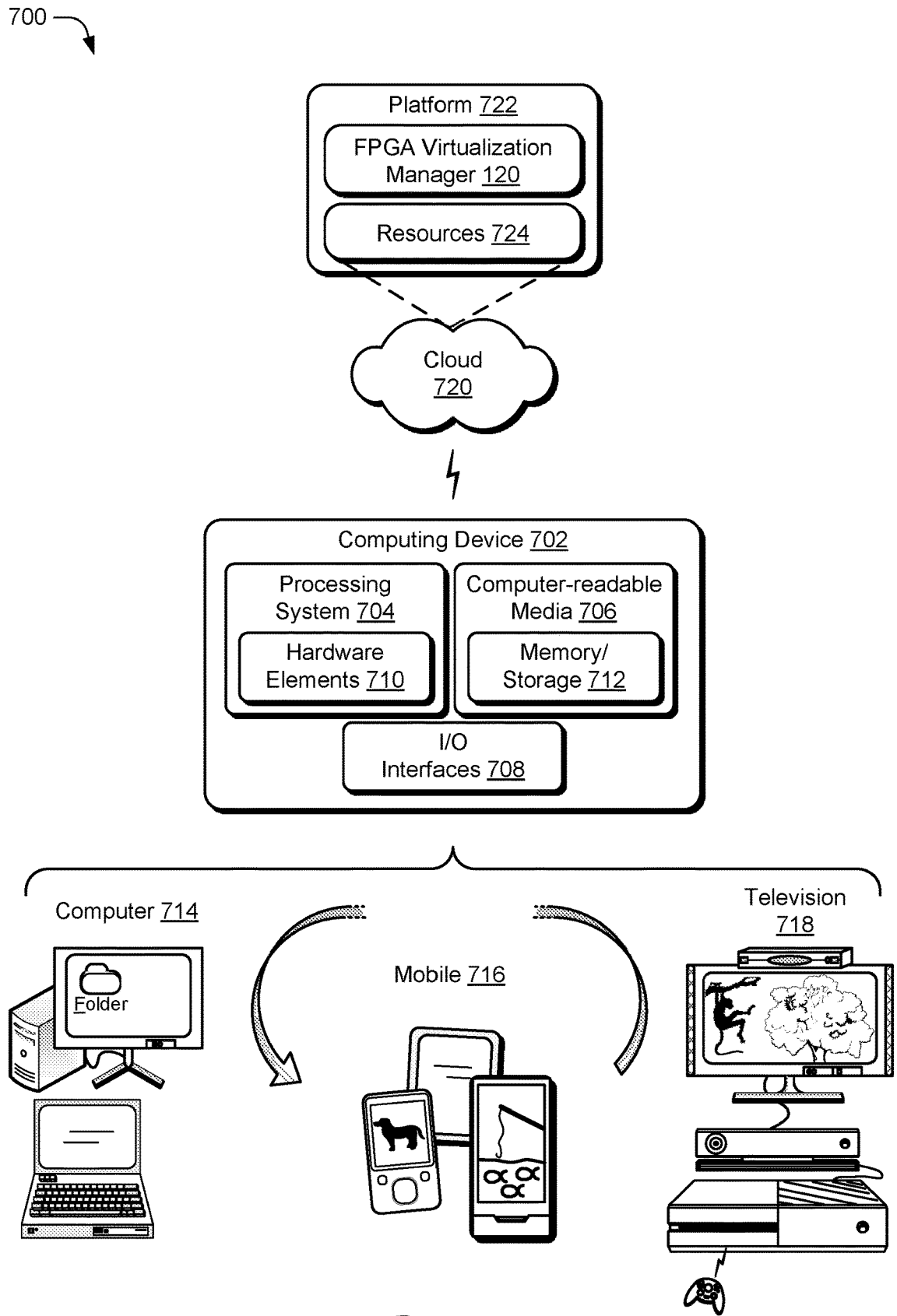
FIG. 7 illustrates an example system including various components of an example device that can be employed for one or more implementations of the techniques described herein.

FIG. 7 illustrates an example system 700 that includes an example computing device 702 that is representative of one or more computing systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 702, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the VM interface 112, the host interface 114, the FPGA virtualization manager 120, and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. For example, the functionality of the FPGA virtualization manager 120 and other modules may also be implemented all or in part through use of a distributed system, such as over a "cloud" 720 via a platform 722 as described below. The FPGA virtualization manager 120 may also be implemented by a host device of the platform 722, such as by one or more servers of a datacenter. The FPGA virtualization manager 120 may also be implemented by an individual computing device 702 or host as described herein.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network. The service may include virtualization services implemented via a suitably configured virtual machine manager module, such as one that includes the FPGA virtualization manager 120.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

EXAMPLE IMPLEMENTATIONS

Example implementations of techniques described herein include, but are not limited to, one or any combinations of the following examples:

Example 1

A method implemented by a computing device, the method comprising: obtaining a unique device identifier corresponding to a device that is configured to provide one or more functionalities; identifying a field-programmable gate array (FPGA) program associated with the unique device identifier, the FPGA program configured to program FPGAs of a host as the device to provide the one or more functionalities; determining whether to allow the FPGA program to be loaded to program the FPGAs of the host by checking the FPGA program against one or more security policies associated with the host, the security policies at least one of listing allowed or prohibited devices by unique device identifiers or indicating configuration criteria for allowing unlisted devices; responsive to a determination that the FPGA program is allowed to be loaded to program the FPGAs, allocating at least a portion of the FPGAs to the device; loading the FPGA program to program the allocated portion of the FPGAs as the device; and generating a virtual device to furnish the one or more functionalities of the device to virtual machines by relaying data between the virtual machines and the programmed portion of the FPGAs.

Example 2

A method as described in example 1, wherein obtaining the unique device identifier comprises receiving a request for the device from at least one of the virtual machines, the request including the unique device identifier.

Example 3

A method as described in example 1, further comprising mapping input and output of the virtual device to respective input and output programmed to the allocated portion of the FPGAs.

Example 4

A method as described in example 3, wherein the virtual device relays the data between the virtual machines and the programmed portion of the FPGAs according to the mapping.

Example 5

A method as described in example 1, further comprising obtaining the FPGA program from storage of the host.

Example 6

A method as described in example 1, wherein the FPGA program is configured to program the FPGAs of the host as the device according to a hardware description language (HDL).

Example 7

A method as described in example 1, wherein the determination that the FPGA program is allowed to be loaded to program the FPGAs includes determining that the FPGA program meets the configuration criteria.

Example 8

A method as described in example 1, wherein determining whether to allow the FPGA program to be loaded to program the FPGAs includes checking the FPGA program against at least two different security policies corresponding to at least two different levels of security.

Example 9

A method as described in example 8, wherein the different levels of security comprise two or more of a group level, a domain level, and an admin level.

Example 10

A method as described in example 1, further comprising exposing the virtual device to the virtual machines, the exposed virtual device relaying the data between the virtual machines and the programmed portion of the FPGAs to furnish the one or more functionalities of the device to the virtual machines.

Example 11

A method as described in example 10, wherein the exposed virtual device is exposed to at least one of the virtual machines hosted on the host or the virtual machines hosted on a different host device.

Example 12

A method as described in example 1, wherein the allocated portion of the FPGAs are programmed as at least one of: an encryption engine; a networking device; a compression engine; or a data storage device.

Example 13

A method as described in example 1, wherein the allocating comprises allocating a portion of one of the FPGAs to the device.

Example 14

A method as described in example 1, wherein the allocating comprises allocating at least a portion of two or more of the FPGAs to the device.

Example 15

A host device comprising: a plurality of field-programmable gate arrays (FPGAs) that are programmable to have different hardware functions; a processor; and computer-readable media having instructions stored thereon that are executable by the processor to implement an FPGA virtualization manager to perform operations comprising: determining that an FPGA program is allowed to be loaded to program the plurality of FPGAs according to one or more security policies of the host device; loading the FPGA program to program an allocated portion of the plurality of FPGAs as a device, including configuring the allocated portion to have hardware functions that enable the programmed device to provide one or more functionalities; and generating a virtual device representative of the programmed device, the generated virtual device configured to furnish the one or more functionalities of the programmed device to virtual machines hosted by the host device by relaying data between the virtual machines and the programmed device.

Example 16

A host device as described in example 15, wherein the FPGA program is associated with a device driver obtained from storage accessible to the host device, the determining being based on checking the device driver against the one or more security policies.

Example 17

A host device as described in example 15, wherein the operations further comprise receiving a request from one of the virtual machines for the device, the request including an identifier of the FPGA program, the determining being based on checking the program identifier against the one or more security policies.

Example 18

A host device as described in example 15, wherein the operations further comprise receiving a request from one of the virtual machines for the device, the request including the FPGA program and a digital signature associated with the FPGA program, the determining being based, at least in part, on whether the digital signature indicates that the FPGA program is trusted.

Example 19

A host device as described in example 15, wherein the operations further comprise: determining that a different FPGA program is not allowed to program the FPGAs according to the one or more security policies; and prohibiting the different FPGA program from programming the FPGAs.

Example 20

A method implemented by a host device, the method comprising: receiving, from a virtual machine and at an input of a virtual device, a request requesting functionality furnished by a device that corresponds to the virtual device and is programmed to field-programmable gate arrays (FPGAs) of the host device; determining a programmed input of the FPGAs that is associated with the input of the virtual device based on a mapping of virtual-device inputs to portions of the FPGAs programmed as inputs; providing data included with the request to the FPGAs via the determined programmed input to enable the programmed device to furnish the requested functionality with the provided data; obtaining, by the virtual device, output data from the FPGAs that is indicative of a result of the functionality furnished by the programmed device; and outputting, by the virtual device, the output data to the virtual machine.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter

What is claimed is:

1. A method implemented by a host computing device to provide services to a client device, the host computing device comprising field programmable gate arrays (FPGAs), the method comprising:
   receiving a request from a virtual machine associated with the client device, the request comprising a unique device identifier, the unique device identifier corresponding to and uniquely identifying a non-virtual physical device that is not available on the host computing device and which is associated with providing one or more hardware functions;
   selecting, from among device drivers available on the host computing device, according to the unique device identifier, a device driver configured to program the FPGAs with an FPGA program that is configured to provide the hardware functions of the unavailable non-virtual physical device;
   selecting the FPGA program, which is associated with the unique device identifier, the FPGA program configured to program the FPGAs of the host computing device to provide the one or more hardware functions;
   determining whether to allow the FPGA program to be loaded to program the FPGAs of the host computing device by checking the FPGA program or the device driver against one or more security policies associated with the host computing device, the one or more security policies comprising criteria to identify allowed or prohibited devices and/or allowed or prohibited device drivers;
   responsive to a determination that the FPGA program is allowed to be loaded to program the FPGAs, allocating at least a portion of the FPGAs;
   loading, by the selected device driver, the selected FPGA program to program the allocated portion of the FPGAs to perform the one or more hardware functions of the unavailable uniquely identified non-virtual physical device;
   generating a virtual device, configured to provide at least one of hardware access paths or software access paths, to relay data between virtual machines and the programmed portion of the FPGAs; and
   outputting, by the virtual device, output data to the virtual machines.

2. The method of claim 1, further comprising mapping input and output of the virtual device to respective input and output programmed to the allocated portion of the FPGAs.

3. The method of claim 2, wherein the virtual device relays the data between the virtual machines and the programmed portion of the FPGAs according to the mapping.

4. The method of claim 1, further comprising obtaining the FPGA program from storage of the host computing device.

5. The method of claim 1, wherein the FPGA program is configured to program the FPGAs of the host computing device as the physical device according to a hardware description language (HDL).

6. The method of claim 1, wherein the determination that the FPGA program is allowed to be loaded to program the FPGAs includes determining that the FPGA program meets the configuration criteria.

7. The method of claim 1, wherein determining whether to allow the FPGA program to be loaded to program the FPGAs includes checking the FPGA program against the one or more security policies.

8. The method of claim 7, wherein the one or more security policies specify different levels of security that comprise two or more of a group level, a domain level, and an admin level.

9. The method of claim 1, further comprising exposing the virtual device to the virtual machines, the exposed virtual device relaying the data between the virtual machines and the programmed portion of the FPGAs to furnish the one or more functions of the device to the virtual machines.

10. The method of claim 9, wherein at least one of the virtual machines uses the virtual device and is hosted on a different host device.

11. The method of claim 1, wherein the allocated portion of the FPGAs is programmed as at least one of:
- an encryption engine;
- a networking device;
- a compression engine; or
- a data storage device.

12. The method of claim 1, wherein the allocating comprises allocating a portion of one of the FPGAs to the host computing device.

13. The method of claim 1, wherein the allocating comprises allocating at least a portion of two or more of the FPGAs to the host computing device.

14. A host device to provide services, the host device comprising:
- a plurality of field-programmable gate arrays (FPGAs) that are programmable to have different hardware functions;
- a hardware processor; and
- computer-readable storage hardware having instructions stored thereon that are executable by the hardware processor to implement an FPGA virtualization manager to perform operations comprising:
  - receiving a request from a virtual machine (VM) associated with the client device, the request comprising a device identifier corresponding to and uniquely identifying a non-virtual physical device that is not available from the host device and which is associated providing the hardware functions;
  - based on the device identifier, finding and selecting, among device drivers on the host device, a device driver that is associated with the device identifier, the device driver configured to program the plurality of FPGAs with an FPGA program configured to program the plurality of FPGAs to provide the hardware functions;
  - determining that the FPGA program is allowed to be loaded to program the plurality of FPGAs according to one or more security policies of the host device, the one or more security policies controlling (i) which devices are allowed to have respective programs loaded into the FPGA and/or (ii) which device drivers are allowed to program the FPGAs;
  - responsive to a determination that the FPGA program is allowed to be loaded to program the FPGAs, loading, by the found device driver, the FPGA program to program an allocated portion of the plurality of FPGAs, the FPGA program configuring the allocated portion to have the hardware functions of the unavailable non-virtual physical device;
  - generating a virtual device configured to provide at least one of hardware access paths or software access paths, the generated virtual device configured to furnish the one or more hardware functions of the programmed allocated portion to virtual machines hosted by the host device by relaying data between the virtual machines and the programmed allocated portion; and
  - outputting, by the virtual device, output data to the virtual machines.

15. The host device of claim 14, the determining that the FPGA program is allowed to be loaded to program the plurality of FPGAs is based on checking the device driver or device identifier against the one or more security policies.

16. The host device of claim 15, wherein the determining comprises checking a program identifier of the FPGA program against the one or more security policies.

17. The host device of claim 15, wherein the determining is based, at least in part, on whether a digital signature of the FPGA program indicates that the FPGA program is trusted.

18. The host device of claim 14, wherein the operations further comprise:
- determining that a different FPGA program is not allowed to program the FPGAs according to the one or more security policies; and
- prohibiting the different FPGA program from programming the FPGAs.

19. A method implemented by a host device comprising field-programmable gate arrays (FPGAs), the method comprising:
- receiving a request from a virtual machine requesting a hardware function furnished by a non-virtual physical device that is not available on the host device, the request comprising a unique device identifier of the device uniquely identifying the unavailable non-virtual physical device, the unavailable non-virtual physical device associated with providing the hardware function;
- selecting, according to the device identifier a device driver that corresponds to the device identifier and that is configured to program the FPGAs;
- providing, by the device driver, an FPGA program configured to enable a portion of the FPGAs to be programmed to furnish the requested hardware function of the unavailable non-virtual physical device;
- determining that the FPGA program is allowed to be loaded to program the FPGAs according to one or more security policies of the host device, the one or more security policies comprising criteria to identify allowed or prohibited devices and/or to identify allowed or prohibited device drivers;
- responsive to a determination that the FPGA program is allowed to be loaded to program the FPGAs, loading, by the selected device driver, the FPGA program to program an allocated portion of the FPGAs;
- instantiating a virtual device to intermediate exchanges between the programmed device portion of the FPGAs and virtual machines that include the virtual machine, the virtual device configured to provide at least one of hardware access paths or software access paths to exchange data between the virtual machines and the programmed portion of the FPGAs;
- obtaining, by the virtual device, output data from the programmed portion of the FPGAs; and
- outputting, by the virtual device, the output data to the virtual machines.

* * * * *